US010540676B2

(12) United States Patent
Guioguio, Jr.

(10) Patent No.: US 10,540,676 B2
(45) Date of Patent: Jan. 21, 2020

(54) INFORMATION ACCESS MANAGEMENT

(75) Inventor: Froilan B. Guioguio, Jr., Bacayan (PH)

(73) Assignee: NCR Corporation, Atlanta, GA (US)

(*) Notice: Subject to any disclaimer, the term of this patent is extended or adjusted under 35 U.S.C. 154(b) by 1390 days.

(21) Appl. No.: 12/955,099

(22) Filed: Nov. 29, 2010

(65) Prior Publication Data
US 2012/0136727 A1 May 31, 2012

(51) Int. Cl.
G06Q 30/02 (2012.01)
H04W 4/50 (2018.01)
H04W 4/02 (2018.01)
H04W 4/33 (2018.01)
H04W 4/021 (2018.01)
H04W 4/029 (2018.01)

(52) U.S. Cl.
CPC ........ G06Q 30/0241 (2013.01); H04W 4/021 (2013.01); H04W 4/50 (2018.02); H04W 4/029 (2018.02); H04W 4/33 (2018.02)

(58) Field of Classification Search
USPC ............................................ 370/338; 705/14
See application file for complete search history.

(56) References Cited

U.S. PATENT DOCUMENTS

| | | | | |
|---|---|---|---|---|
| 7,412,405 B2* | 8/2008 | Huang | ................... | G06Q 30/00 705/14.39 |
| 7,437,554 B1* | 10/2008 | Arnold | .................. | G06F 1/1626 713/160 |
| 7,620,026 B2* | 11/2009 | Anschutz et al. | ............ | 370/338 |
| 7,715,857 B2 | 5/2010 | Montemer et al. | | |
| 8,209,536 B2* | 6/2012 | Yao | ....................... | G06Q 20/401 380/259 |
| 8,705,498 B2* | 4/2014 | Sennett et al. | ................. | 370/338 |
| 2009/0070217 A1* | 3/2009 | Dharmaji et al. | .............. | 705/14 |

* cited by examiner

Primary Examiner — Saba Dagnew
(74) Attorney, Agent, or Firm — Schwegman, Lundberg & Woessner

(57) ABSTRACT

Apparatus, systems, and methods may operate to transmit applications to mobile devices. The applications may operate to enable the reception of source and advertising information from a wireless transmitter. Reception may occur at a wireless receiver in a mobile device, as part of a single transmission and without prior solicitation by the mobile device. The source information can identify a source associated with the advertising information. The advertising information is stored in the mobile device when the source information and/or distance information associated with the source information comply with conditions included in a storage policy associated with the mobile device. Additional apparatus, systems, and methods are disclosed.

17 Claims, 4 Drawing Sheets

INFORMATION ACCESS MANAGEMENT

BACKGROUND

The amount of information made available to people as they travel within a city or along a highway is often overwhelming. In addition to the business names and street addresses, there may be an array of information provided by signage, such as advertising billboards. Depending on the needs of a particular traveler, some of this information is more useful than others.

Travelers in vehicles may attempt to capture some of this information by taking notes using pen and paper, typing details into a mobile phone, taking a picture, or returning to the point of interest and memorizing what they see. Each of these methods is tedious, time-consuming, and often unreliable.

SUMMARY

In various embodiments, access to information is managed by transmitting source information and advertising information from a wireless transmitter to a wireless receiver in a mobile device, perhaps as part of a single transmission and without prior solicitation. The wireless transmitter may be associated with a building or a billboard, and the source information may be used to identify a source associated with the advertising information. The advertising information may be stored in the mobile device when the source information and distance information associated with the source information comply with conditions included in a storage policy associated with the mobile device.

In some embodiments, access to information is managed by receiving a request at a server to download an advertising application from a mobile device having a wireless receiver, and transmitting the advertising application to the mobile device. The advertising application may have instructions which, when executed by the mobile device, cause the mobile device to receive source information from a source, to compare the source information and distance information associated with the source information to conditions included in a storage policy associated with the mobile device, and to store at least a portion of a transmission including advertising information associated with the source, in the mobile device, when the source information and the distance information comply with the conditions.

In some embodiments, a system comprises a wireless transmitter and at least one mobile device. The mobile device(s) may have a wireless receiver to receive source information from the wireless transmitter, and a processor to compare the source information and distance information associated with the source information to conditions included in a storage policy associated with the mobile device. The mobile device(s) may operate to store advertising information associated with the source information when the source information and the distance information comply with the conditions.

These embodiments, and others, will be described in more detail below.

DETAILED DESCRIPTION

Figure 1:
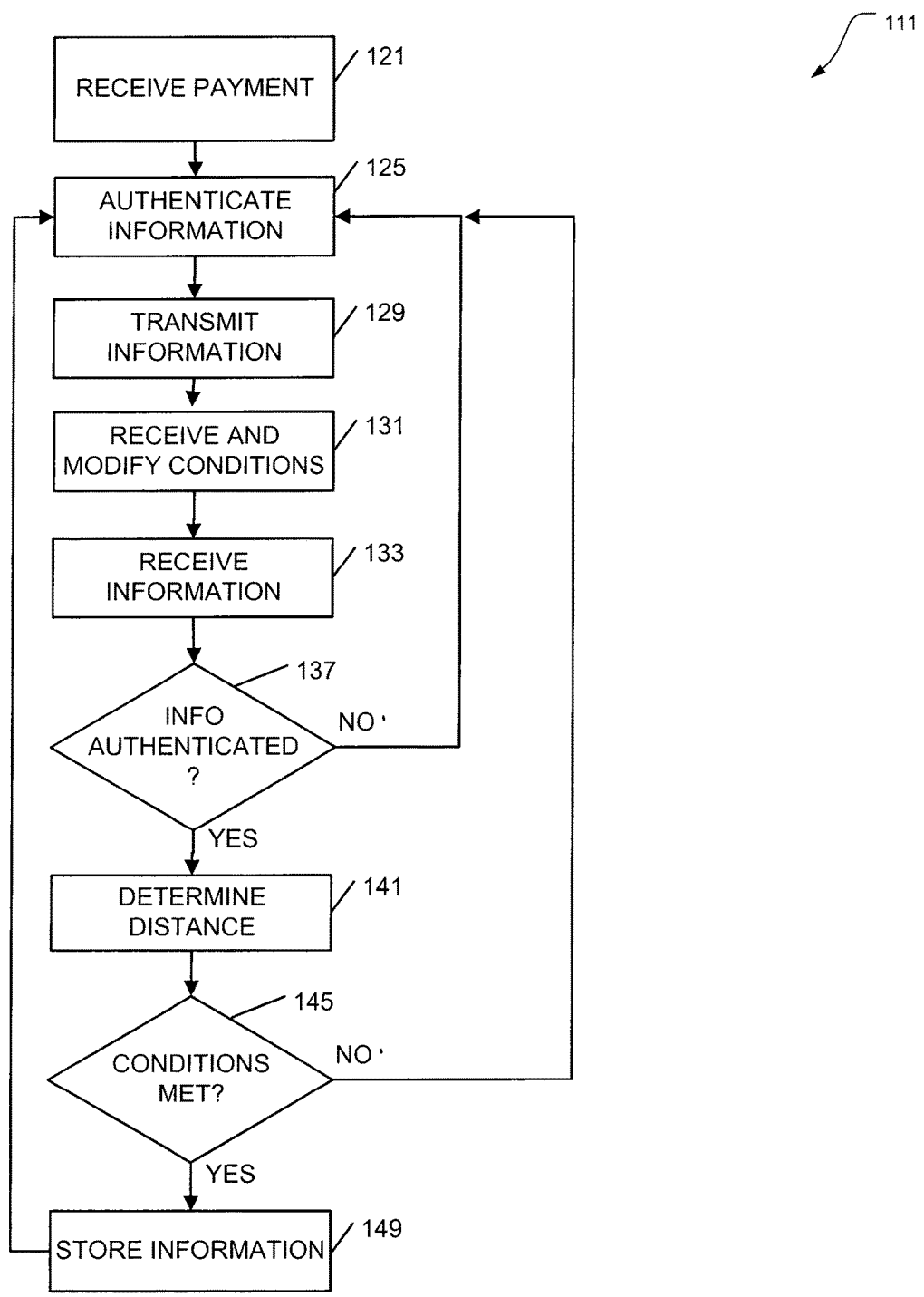
FIG. 1 is a flow diagram of methods that can be used to manage access to information, according to various embodiments of the invention.

It is well-known that billboards and other signage offer useful information to potential business customers. However, it is often difficult for a traveler to read and process the information on a billboard during the time the information is within view. Specific details, such as dates, telephone numbers, and names may be missed, or forgotten. This difficulty is especially apparent when traveling in a vehicle, and the time available to note details is very short.

In another example of this problem, travelers can be confused by the information presented when they find themselves in a new location, such as a vacation destination. While traveling in the area, intersections with billboards and other signs (e.g., with the names and directions to beach resorts) may appear. In cases where there are many billboards in a single area, each describing directions to a different place, it is difficult to absorb the content as the traveler passes by.

A similar situation occurs when a person attempts to drive to the physical location of a store found online. When the street in which the store is located is crowded with many other stores and buildings, it is often difficult to find the correct location, especially when the store is not large enough to be recognized at a distance.

To address these challenges, among others, in various embodiments, apparatus, systems, and methods are provided to more conveniently and reliably manage access to information. The information in these cases may take the form of "source information" that identifies a specific source of advertising information (e.g., the unique name of a business, or a government entity located at a specific physical address). The "advertising information", in turn, informs the consumer about goods or services offered by that particular source, and/or the conditions under which those goods/services may be procured (e.g., operating hours, menus, prices, etc.). The source information is transmitted to consumers with mobile devices in a manner that allows automatically storing the associated advertising information in the mobile device when the source information complies with conditions imposed by a storage policy. In this way, many embodiments enable travelers and other consumers to conveniently access information details available in their immediate environment, by selectively saving them for later recall.

Thus, instead of manually making notes while walking past a billboard, or trying to memorize details presented by a sign, advertising information may be automatically downloaded to a mobile device, such as a cellular telephone or tablet computer. Or instead of stopping a vehicle to read billboards to determine the location of a vendor, the address can be automatically downloaded to a mobile device. In some embodiments, the consumer can set the conditions so that an alarm (e.g., buzz or beep) is generated when the advertising information received matches selected key words, such as the name of a specific business, or more generic terms, such as "library" or "gas station".

Transmission may occur over a variety of wireless networks, either directly from a sign or building, or from nearby transmitters. If there are many signs or buildings in a particular area, these may operate as single nodes in a network of nodes in some embodiments.

Reception policy conditions can be used to enhance reliability of the information transmitted, as well as consumer satisfaction. For example, signs or buildings broadcasting messages might be approved by a governing body. The source information and advertising information may be subject to authentication, so that mobile devices are programmed, perhaps as part of their storage policy conditions, to store information only when accompanied by valid authentication keys. Options to display only some, or all of the information received may be put in place, with easy deletion of unwanted or unused information made available (e.g., manually selected by the consumer, or via programmed, periodic removal of the oldest information, perhaps to maintain a designated buffer capacity to receive new information).

In some embodiments, the amount of information per source may be limited by the storage policy conditions. For example, a received character limit per sign or building may be imposed, after which source/advertising information is no longer stored.

Some users may operate their mobile devices at an airport or other location that hosts common carriers. Thus, in some embodiments, when the mobile device is brought to an airport, for example, it may become a medium that is used to read airport bulletins, including departure/arrival times, along with other news updates. Thus, many embodiments may be realized.

For example, FIG. 1 is a flow diagram of methods 111 that can be used to manage access to information, according to various embodiments of the invention. In some cases, the methods 111 include activities associated with a sign or building that transmits source information and advertising information.

Apparatus that operate according to these methods 111 may comprise a wireless transmitter and/or one or more mobile devices, such as a cellular telephone, a personal computer (e.g., laptop, netbook, or pad/tablet computer), or a vehicle. The mobile devices have a wireless receiver to receive at least the source information from the wireless transmitter. Mobile devices also include a processor to compare the source information and distance information associated with the source information (e.g., how far is the mobile device from the source identified by the source information) to conditions included in a storage policy associated with the mobile device. The processor can operate to store the advertising information in the mobile device when the source information and the distance information, and/or other elements associated with the source information, comply with the conditions included in the storage policy.

The advertising information may be transmitted, and perhaps encrypted, for reception and decryption by a paying audience. Payment may be made in terms of monetary credit, or reward program credit, perhaps made directly to a cellular telephone service provider when the mobile device comprises a cellular telephone.

In some embodiments then, a method 111 of managing access to information may begin at block 121 with receiving electronic payment in return for providing an opportunity to receive the advertising information.

If either the source information or advertising information are not authenticated, the process of receiving and/or storing the advertising information may be halted in some embodiments. A governing body may provide authentication of the source information and/or advertising information, and in some cases, mobile devices may operate to receive and/or store advertising information only from sources that present valid authentication keys. Thus, the method 111 may continue on to block 125 with authenticating the source information, the advertising information, or both.

The method 111 may continue on to block 129 with transmitting the source information and advertising information from a wireless transmitter to a wireless receiver in a mobile device. Transmitting the source information and advertising information may occur as part of a single transmission, or in separate transmissions, without prior solicitation by the mobile device. The activity at block 129 may include transmitting the source information and/or the advertising information, including at least one authentication key.

The wireless transmitter may be associated with a building or a sign. The source information is used to identify the source associated with the advertising information. For example, the source information might include <STORE-NAME #123>, which identifies the store having "STORE-NAME" as its name, and "123" as its number. In many cases, this information alone is sufficient to identify a single store (and implicitly, its location) within the confines of an entire country, or even worldwide.

Another example of source information might include <LIBRARY COORDINATES 123>. In this case, the term "LIBRARY" may be a generic term that identifies the source as a library open to the public. The term "COORDINATES 123" may be used as an explicit representation of a specific GPS (Global Positioning System) location on the surface of the Earth. Other source identification methods can be used.

The conditions imposed by the storage policy can be modified at will, perhaps limiting the information stored to that which is provided from selected sources, within a particular distance of the mobile device. The policy may be maintained remotely, at a service provider, or locally, within the device itself. A cellular service provider, for example, may receive user preferences and modify the storage policy accordingly. Storage policy conditions may be set to block or accept information from specific sources, or categories of sources, for example.

Thus, the method 111 may continue on to block 131 with receiving and modifying conditions that form the mobile device storage policy. The conditions may comprise a source limitation, a reception range limitation, some other limitation, or a combination of these.

For example, a source limitation might form part of a condition that prevents reception and/or storage of advertising information from a restaurant that the traveler does not like because it is too expensive (e.g., blocking a specific source), or advertising information from all restaurants, as a broader category of sources. A reception range limitation may prevent reception and/or storage of advertising information from sources that are located beyond a specified distance from the receiver, such as a mile, or a half-mile. Other limitations may be used. The activity at block 131 may comprise modifying the storage policy to incorporate the source limitation and/or the reception range limitation in the conditions.

The method 111 may continue on to block 133 to comprise receiving the source information by the mobile device. The activity at block 133 may further comprise receiving the advertising information (if reception is not blocked by conditions imposed in the mobile device storage policy).

Examples of advertising information include service provider operating hours, a list of goods/services provided, prices, sales, discounts, contact information, and other information that describes the goods/services provided, or how they may be procured.

The method 111 may continue on to block 137 to include determining whether the source information and/or advertising information has been authenticated. If not, the method 111 may comprise returning to bock 125. Otherwise, the method 111 may continue on to block 141.

The mobile device itself, or a wireless service may operate to determine how far the transmitter is from the mobile device. If it is too far away, according to the conditions imposed by the storage policy, then the advertising information will not be stored in the mobile device. Thus, the method 111 may include, at block 141, determining the distance information based on the source information and a current location of the mobile device.

The distance between the source and the mobile device may be determined in a number of ways. As noted previously, the location of the source may be transmitted with the source information, either implicitly, or explicitly.

For example, a location comprising the GPS coordinates or street address of the building housing the wireless transmitter may be broadcast by the wireless transmitter. In some instances an explicit value for the location is not transmitted. For example, the mobile device may have access to a lookup table that provides the location of the source identified by the source information (e.g., <POLICE STATION #12 CHICAGO, ILL.> identifies police station number 12 in Chicago, Ill., in the United States of America). Here the source information comprises the location associated with the source, both implicitly (by identifying station number 12), and explicitly (by identifying the city Chicago). A lookup table or other source can provide GPS coordinates, or a street address to definitively locate the police station. In some embodiments, the advertising information may also contain location information.

The mobile device may operate to determine the distance between the mobile device and the source associated with the wireless transmitter, perhaps using a service, or via internal calculation. Thus, the activity at block 141 may comprise executing instructions that cause the mobile device to determine the distance information, wherein the distance information comprises an approximate distance between the mobile device and a physical location of the source.

If the conditions imposed on the source information and/or the distance (from the source) by the mobile device storage policy are met, as determined at block 145, the method 111 may continue on to block 149. Otherwise, the method 111 may return to block 125.

At block 149, the method 111 may include storing the advertising information in the mobile device when the the conditions are met at block 145, such as when the source information and distance information associated with the source information comply with conditions included in the storage policy associated with the mobile device.

Figure 2:
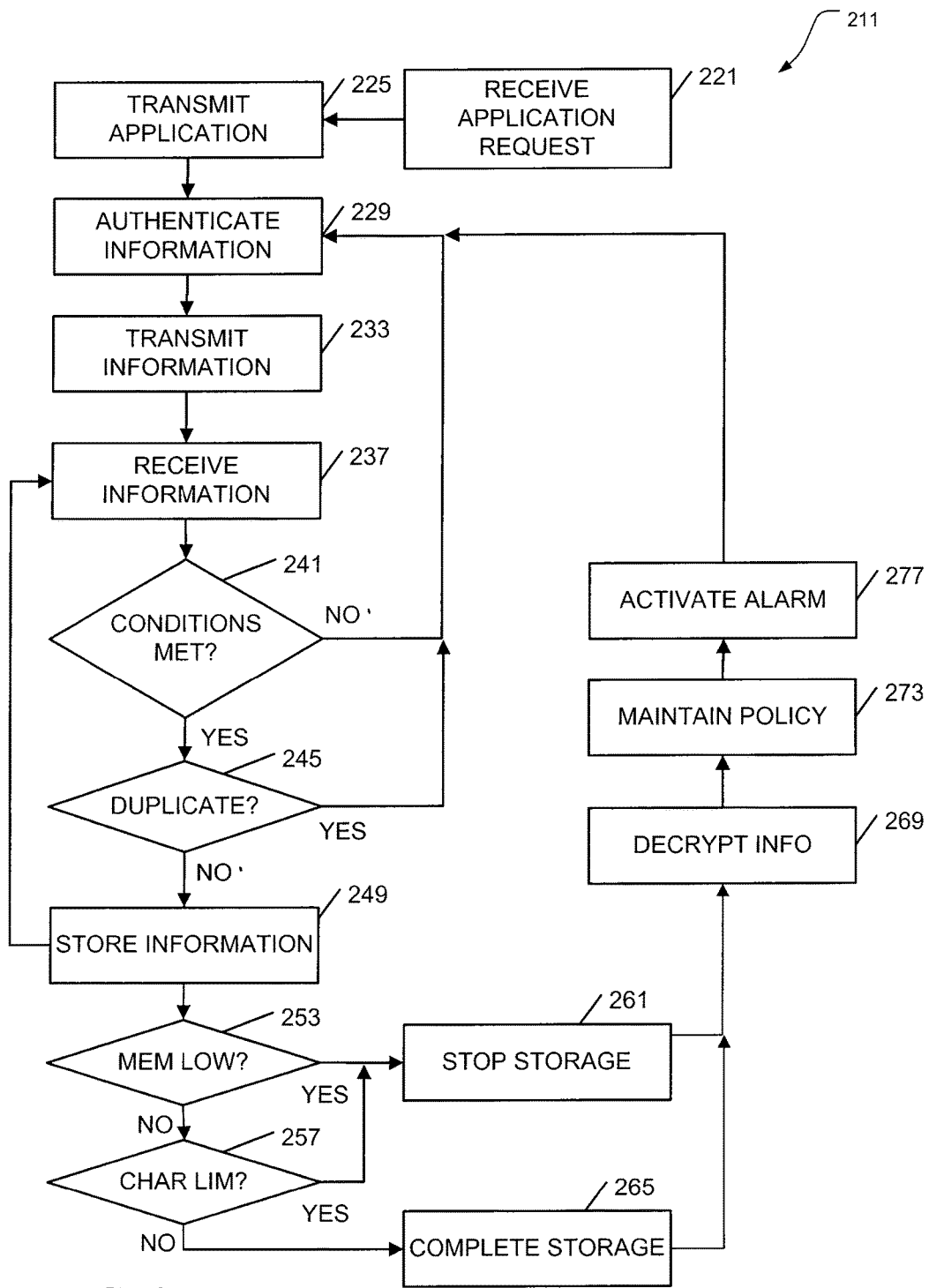
FIG. 2 is a flow diagram of additional methods that can be used to manage access to information, according to various embodiments of the invention.

FIG. 2 is a flow diagram of additional methods 211 that can be used to manage access to information, according to various embodiments of the invention. In this case, the methods 211 may comprise making an application to receive the advertising information available to cell phone and tablet computer users, such as from a server providing the applications, perhaps as part of an application marketplace. As noted previously, the source associated with the advertising information may comprise an advertising entity, such as a business that occupies a building, or that purchases signage to advertise the goods and services provided.

Thus, the method 211 may begin at block 221 with receiving a request at a server to download an advertising application from a mobile device having a wireless receiver. The method 211 may continue at block 225 with transmitting the advertising application to the mobile device, so that the application can be downloaded to the mobile device, and executed by the mobile device.

The advertising application transmitted to the mobile device may have instructions which, when executed by the mobile device, cause the mobile device to engage in a variety of activities. These activities may include receiving source/advertising information from the source, comparing calculated or received information to mobile device storage policy conditions, and storing at least some of the advertising information associated with the source information when compliance with the conditions is determined.

The mobile device may operate to receive and/or store only authenticated advertising information. Thus, the source of the source information and advertising information may operate to provide authentication for the information at block 229.

In most embodiments, the method 211 includes, at block 233, transmitting the source information and/or advertising information to one or more mobile devices. The method 211 thus further includes, at block 237, receiving the source information and/or the advertising information from the source, by a wireless receiver in the mobile device.

The method 211 may continue on to block 241 to determine whether the mobile device storage policy conditions have been met. Thus, the activity at block 241 may comprise comparing the source information and distance information associated with the source information to conditions included in a storage policy associated with the mobile device.

For example, as part of the conditions imposed by the storage policy, the mobile device may operate to receive and/or store only authenticated advertising information. Thus, the activity at block 241 may include executing instructions that cause the mobile device to determine whether the source information and/or the advertising information has been authenticated, and to refrain from receiving and/or storing the advertising information when either the source information or the advertising information have not been authenticated.

The amount of advertising information to be stored from each source can be limited in a variety of ways. For example, at block 245, the instructions, when executed, may cause the mobile device to refrain from storing a duplicate of the advertising information when another transmission from the (same) source is received.

The method 211 may continue on to block 249 with storing at least a portion of a transmission from the wireless transmitter associated with the source, including the advertising information associated with the source, in the mobile device (e.g., when the source information and the distance information comply with the conditions, as determined at block 241).

If too much advertising information is received, the process of storing the information can be halted. Thus, at block 253, the instructions, when executed, may cause the mobile device to determine that a measure of available memory in the mobile device has reached or gone below a lower limit included in the conditions, and to cease storing the advertising information until the amount of available memory rises above the lower limit.

The amount of advertising information stored for each transmission can be limited in other ways. For example, at block 257, the instructions, when executed, may cause the mobile device to cease storing the advertising information at block 261 when the number of stored characters in the advertising information equal or exceed a character limit included in the conditions. Otherwise, storage may be completed at block 265.

The source information and/or advertising information may be encrypted, so that only a select audience can receive it. Thus, the instructions, when executed as part of the activity at block 269, may cause the mobile device to decrypt at least one of the source information or the advertising information.

The storage policy can be maintained on a network server, and/or in the mobile device itself. Thus, the instructions, when executed as part of the activity at block 273, may cause the mobile device to maintain the storage policy in a memory of the mobile device.

The mobile device can be programmed to search for keywords among the advertising information, and to alert the user when such information is found. Thus, the method 211 may comprise executing instructions at block 277 that cause the mobile device to activate at least one of an audible or a visible alarm upon receiving a portion of the advertising information that matches keyword information stored in the mobile device.

The methods described herein do not have to be executed in the order described, or in any particular order. Moreover, various activities described with respect to the methods identified herein can be executed in repetitive, serial, or parallel fashion. The individual activities of the methods shown in FIGS. 1 and 2 can also be combined with each other and/or substituted, one for another, in various ways. Information, including parameters, commands, operands, and other data, can be sent and received in the form of one or more carrier waves. Thus, many other embodiments may be realized.

The methods of managing access to information shown in FIGS. 1 and 2 can be implemented in various devices, as well as in a computer-readable storage medium, where the methods are adapted to be executed by one or more processors. Further details of such embodiments will now be described.

Figure 3:
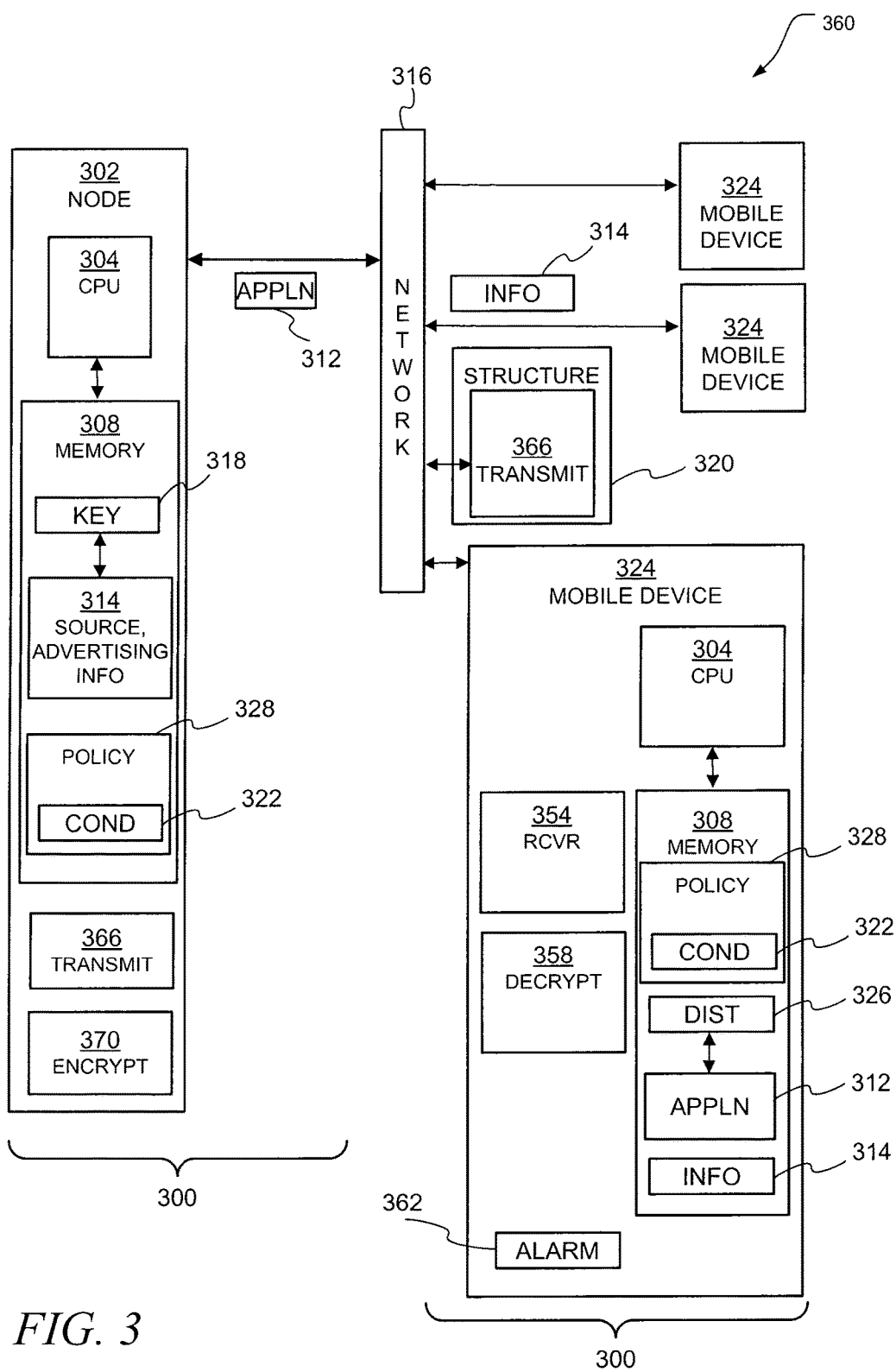
FIG. 3. is a block diagram of apparatus and systems that can be used to manage access to information, according to various embodiments of the invention.

FIG. 3. is a block diagram of apparatus 300 and systems 360 that can be used to manage access to information, according to various embodiments of the invention. Here it can be seen that the apparatus 300 may take many forms, perhaps comprising one or more processing nodes 302, one or more processors 304, multiple memories 308, multiple mobile devices 324, and/or a structure 320, such as a building or signage.

The apparatus 300 may comprise a client, a server, or some other networked processing node. The structure 320 may comprise one or more nodes 302, or any one or more components thereof.

The processing nodes 302 may comprise physical machines or virtual machines, or a mixture of both. The nodes 302 may also comprise networked entities, such as servers and/or clients. In some basic implementations, the operations described can occur entirely within a single node 302. The apparatus 300 may thus comprise a single desktop computer or server, for example, or a number of networked nodes 302.

In some embodiments then, an apparatus 300 may comprise at least one mobile device 324 having a wireless receiver 354 to receive the source information 314. The apparatus 300 may also comprise one or more processors 304 to compare the source information 314 and distance information 326 associated with the source information 314 to conditions 322 included in a storage policy 328 associated with the mobile device 324. The mobile device 324 may operate to store the advertising information 314 when the source information 314 and the distance information 326 comply with the conditions 322. Authentication keys 318 may be stored in the memory 308 of the nodes 302.

The mobile device 324 may comprise any number of items, including a vehicle, a cell phone, and/or a personal computer (e.g., a tablet computer or netbook, among others). The wireless receiver 354 in the mobile device 324 can make use of various technologies. Thus, the wireless receiver 354 may comprise one of a radio receiver, a light receiver, or a sonic receiver, as well as combinations of these.

Applications 312 having instructions to execute on the mobile device 324 may be stored in the memory 308 of the mobile device 324. The mobile device 324 may include a decryption module 358 to decrypt encrypted transmissions from the wireless transmitter 366.

The apparatus 300 may include one or more alarms 362. Thus, the apparatus 300 may comprise at least one of an audible or visible alarm 362, which may be activated by the processor 304 upon receiving a portion of the advertising information that matches keyword information (e.g., forming part of the conditions 322) stored in the mobile device 324.

FIG. 3 further includes a block diagram of a system 360 that can be used to manage access to information according to various embodiments of the invention. The system 360 may comprise multiple instances of the apparatus 300. The system 360 might also comprise a cluster of nodes 302, including physical and virtual nodes. It should be noted that any of the components in the nodes 302 may be included in the mobile devices 324, in any combination. Similarly, any of the elements of the mobile devices 324 can be included in the nodes 302, in any combination.

The nodes 302 may exist as a device embedded within a structure 320 (e.g., as an embedded device), or as a regular desktop or laptop computer that includes a terminal/display to show the activities conducted while the node 302 is active. Thus, the system 360 may also comprise a terminal and/or display coupled to the nodes 302 to display visible indications of the activities conducted at the nodes 302.

For example, a system 360 may comprise both the transmitter 366 of source information 314 and advertising information 314, and one or more mobile devices 324 that operate to selectively receive the source and/or advertising information 314. Such a system 360 may be operated by a telecommunications carrier or service provider, for example.

Thus, in some embodiments, a system 360 comprises a wireless transmitter 366 to transmit at least source information 314 associated with advertising information 314, and at least one mobile device 324.

The transmitter of advertising information may be attached to a building, or a sign, among other structures 320. Thus, the wireless transmitter 366 may be included in one of a sign or a building.

The transmitter 366 may encrypt information so that only a select audience can decrypt it. Thus, the wireless transmitter 366 may be coupled to an encryption module 370 to encrypt at least one of the source information 314 or the advertising information 314.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 111 and 211 of FIGS. 1 and 2, respectively. Modules may comprise hardware, software, and firmware, or any combination of these. Additional embodiments may be realized.

Figure 4:
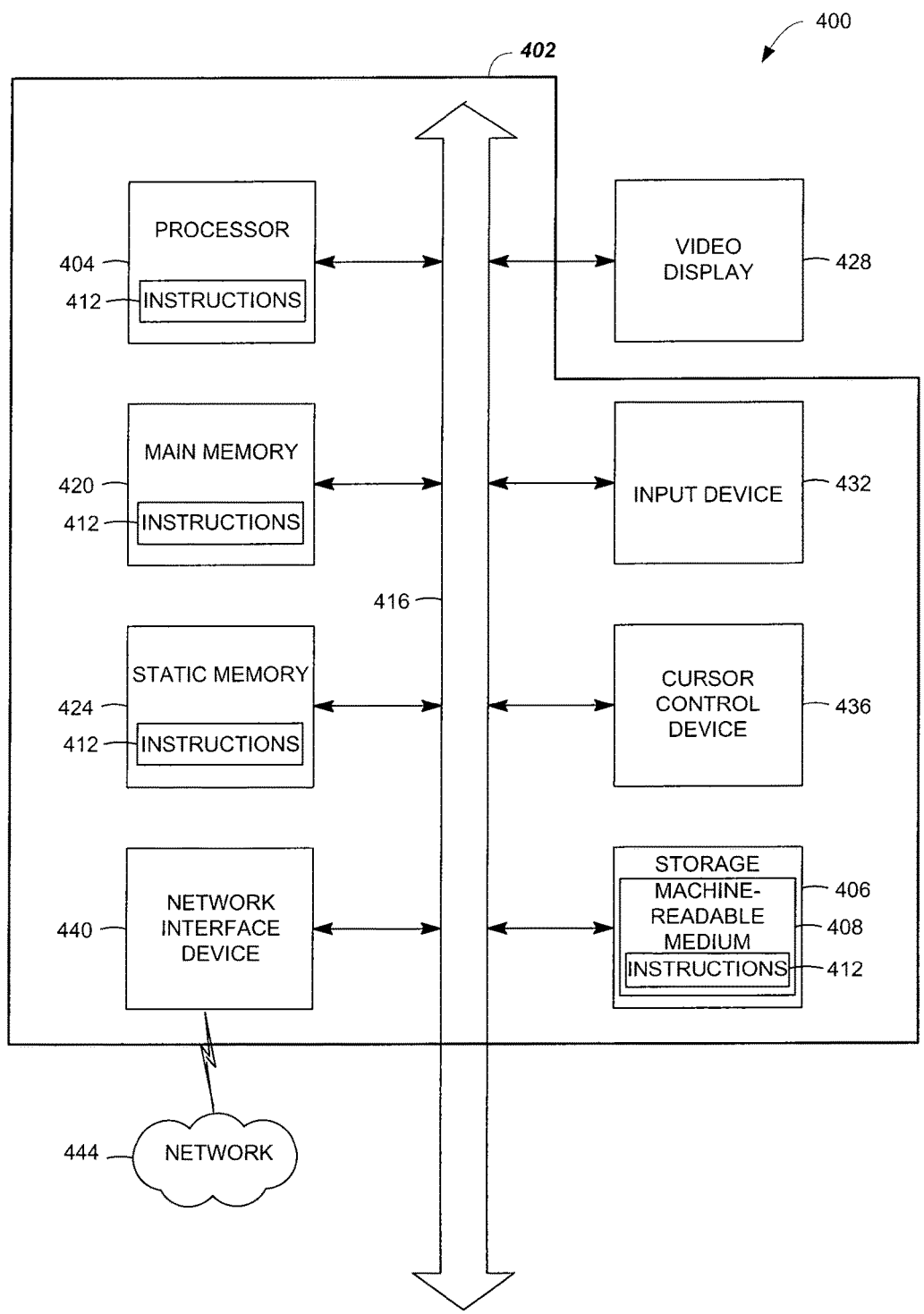
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods, apparatus, and systems disclosed above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a personal digital assistant (PDA), a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database), and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a stand-alone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to provide new options for managing access to information, including selected advertising information broadcast by businesses and associated signage. More efficient communication, with increased customer satisfaction, may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. § 1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method comprising:
obtaining, by a processor embedded in one of a building or a sign, an authentication key from a governing body for at least one of source information or advertising information; and
transmitting, in a single transmission by a wireless transmitter embedded in the one of the building or the sign, the source information and the advertising information to a wireless receiver in a mobile device without prior solicitation by the mobile device, the single transmission including:
the authentication key for the at least one of the source information or the advertising information from the governing body;
identification of a source corresponding to the advertising information in the source information; and
an encryption of the advertising information to be stored in the mobile device when the source information and location information corresponding to the source information comply with conditions included in a storage policy of the mobile device that references the governing body, the conditions specify that the mobile device is to refrain from storing a duplicate of the advertising information when another transmission from the source is received.

2. The method of claim 1, further comprising:
receiving electronic payment in return for providing an opportunity to receive the advertising information.

3. The method of claim 1, wherein at least one of the source information or the advertising information includes the location information.

4. The method of claim 1, further comprising:
receiving at least one of a source limitation or a reception range limitation; and
modifying the storage policy to incorporate the at least one of the source limitation or the reception range limitation in the conditions.

5. The method of claim 1, wherein the mobile device comprises:
at least one of a cellular telephone, a personal computer, or a vehicle.

6. A method comprising:
receiving a request, at a server to download an advertising application from a mobile device having a wireless receiver; and
transmitting the advertising application to the mobile device, the advertising application having an authentication key from a governing body and instructions which, when executed by the mobile device, cause the mobile device to:
receive an unsolicited single transmission from a wireless transmitter controlled by a processor, both the wireless transmitter and the processor being embedded in a building or a sign, the single transmission having source information and advertising information including:
the authentication key from authenticating at least one of the source information or the advertising information to the governing body;
an identification of a source corresponding to the advertising information in the source information; and
an encryption of the advertising information;
compare the source information and location information corresponding to the source information to conditions included in a storage policy of the mobile device; and
store the advertising information, in the mobile device, when the source information and the location information comply with the conditions, wherein the conditions include to store information only when accompanied by a valid authentication key by the governing body specified in the storage policy and to refrain from storing a duplicate of the advertising information when another transmission from the source is received.

7. The method of claim 6, wherein the instructions, when executed, cause the mobile device to:
determine that a measure of available memory in the mobile device has reached or passed a lower limit included in the conditions; and
cease storing the advertising information until the available memory is greater than the lower limit.

8. The method of claim 6, wherein the instructions, when executed, cause the mobile device to:
cease storing the advertising information when a number of stored characters in the advertising information equal or exceed a character limit included in the conditions.

9. The method of claim 6, wherein the instructions, when executed, cause the mobile device to:
maintain the storage policy in a memory of the mobile device.

10. The method of claim 6, wherein the instructions, when executed, cause the mobile device to:
decrypt the advertising information.

11. The method of claim 6, wherein the instructions, when executed, cause the mobile device to determine the distance information, wherein the distance information comprises an approximate distance between the mobile device and a physical location of the source.

12. The method of claim 6, wherein the instructions, when executed, cause the mobile device to:
activate at least one of an audible or a visible alarm upon receiving a portion of the advertising information that matches keyword information stored in the mobile device.

13. A system comprising:
a first processor and instructions that, when executed by the first processor, cause the node to obtain an authentication key from a governing body for at least one of source information or advertising information corresponding to a physical site that is at least one of a building or a sign, the first processor being embedded in the at least one of the building or the sign;
a wireless transmitter at the physical site to, in a single transmission, transmit, unsolicited, the wireless transmitter being embedded in the at least one of the building or the sign, source information corresponding to advertising information and the advertising information to at least one mobile device, the single transmission including:

an authentication key for authenticating at least one of the source information or the advertising information to a governing body;

an identification of a source corresponding to the advertising information in the source information; and an encryption of the advertising information; and the at least one mobile device having:

a wireless receiver to receive the single transmission; and a second processor to:

compare the source information and location information corresponding to the source information to conditions included in a storage policy of the mobile device; and store the advertising information when the source information and the location information comply with the conditions, wherein the conditions include to store information only when accompanied by a valid authentication key by the governing body specified in the storage policy and to refrain from storing a duplicate of the advertising information when another transmission from the source is received.

14. The system of claim 13, wherein the wireless transmitter is included in one of a sign or a building.

15. The system of claim 13, wherein the mobile device comprises one of a cellular telephone, a personal computer, or a vehicle.

16. The system of claim 13, wherein the wireless transmitter is coupled to an encryption module to encrypt the source information.

17. The method of claim 1, further comprising:

determining the distance information based on the source information and a current location of the mobile device.

* * * * *